June 20, 1944.   C. B. SEEM   2,351,840
DOUGH DIVIDER
Filed June 11, 1943   6 Sheets-Sheet 4
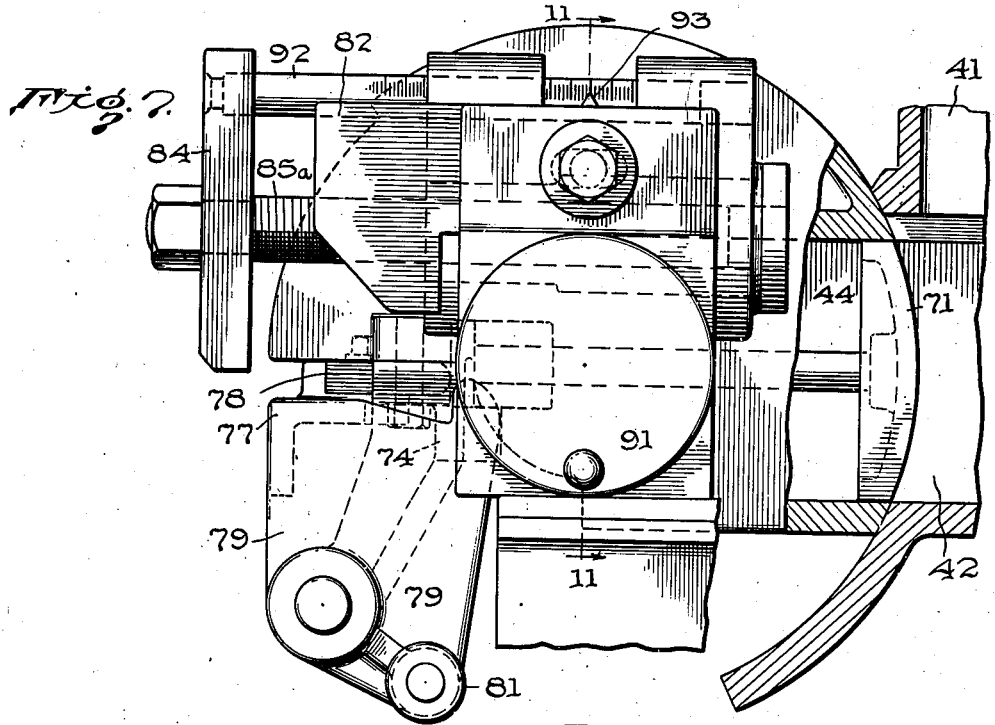
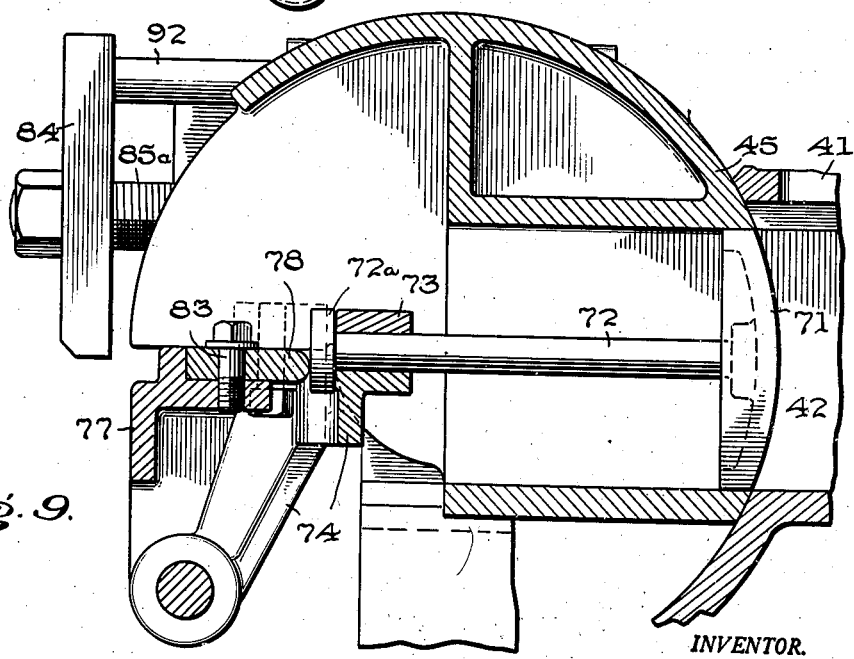
INVENTOR.
CHARLES B. SEEM
BY
HIS ATTORNEYS

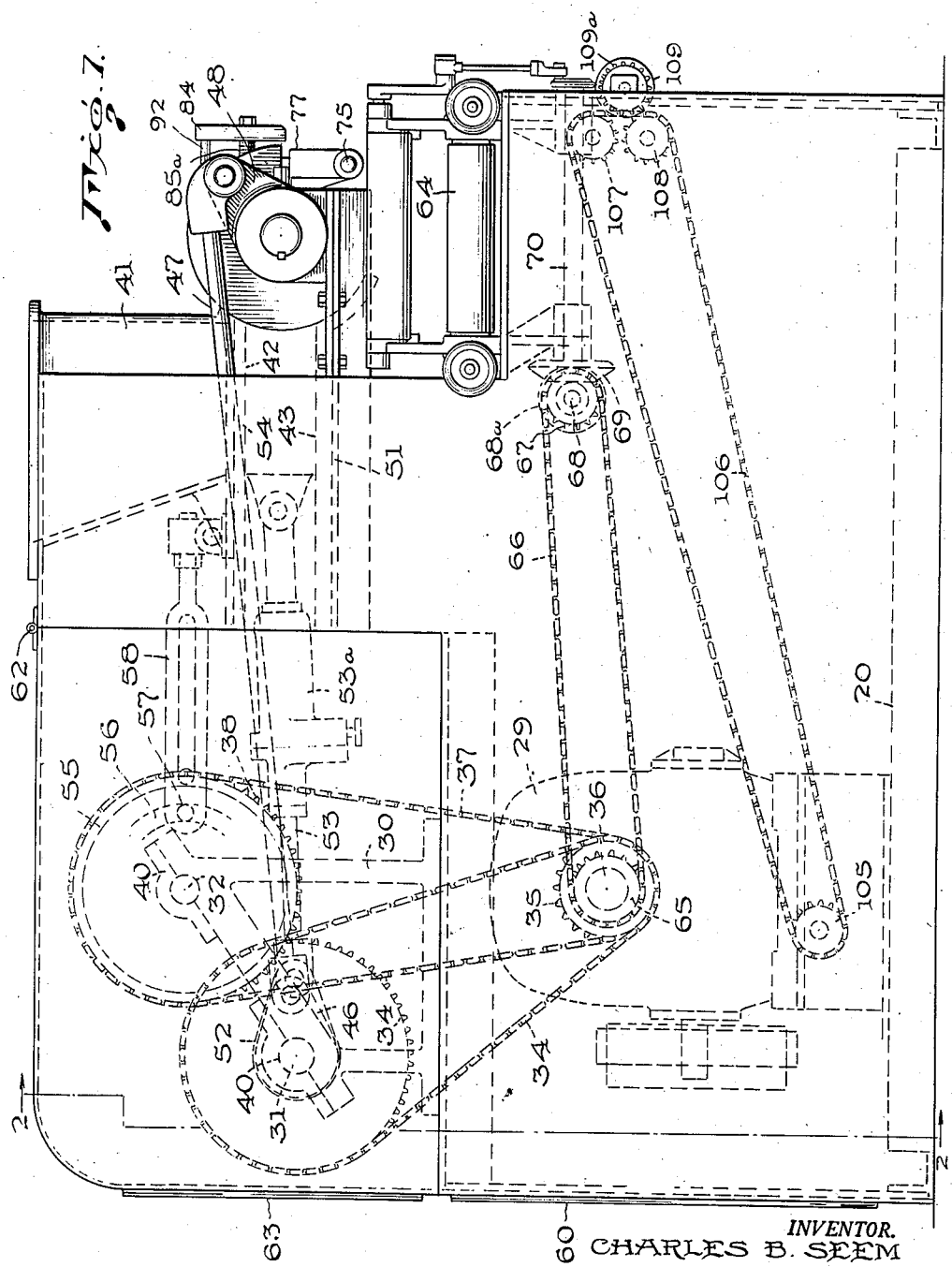

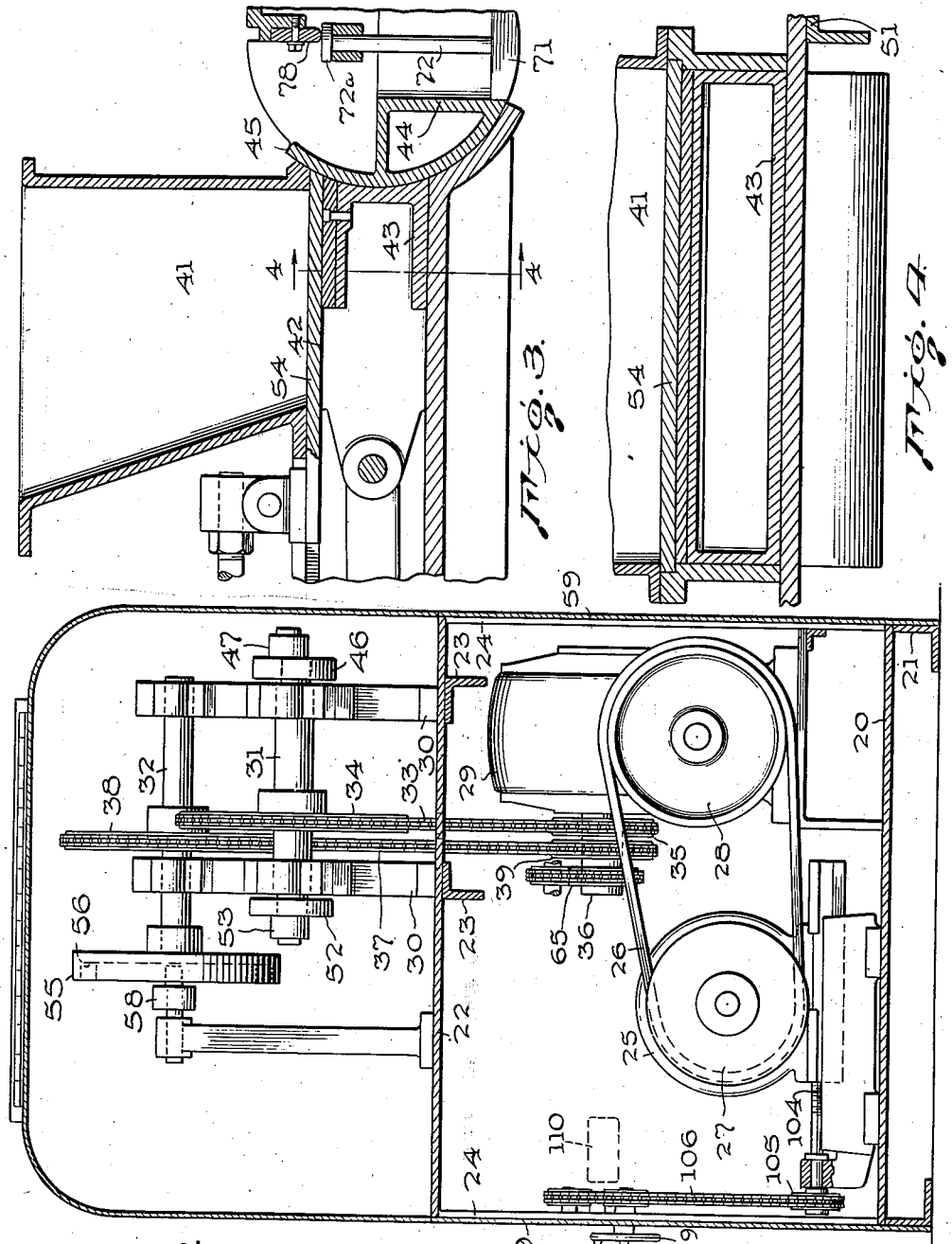

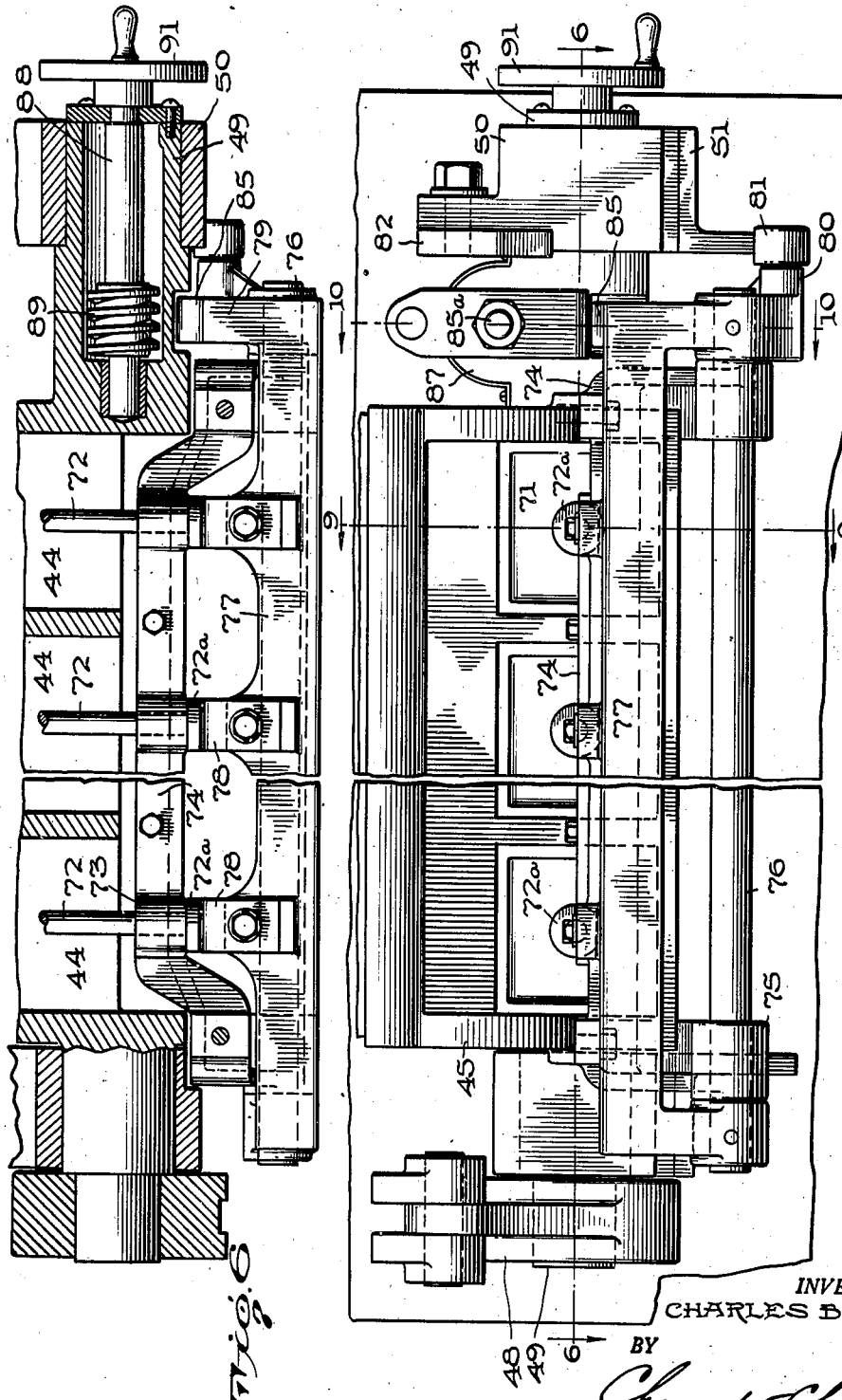

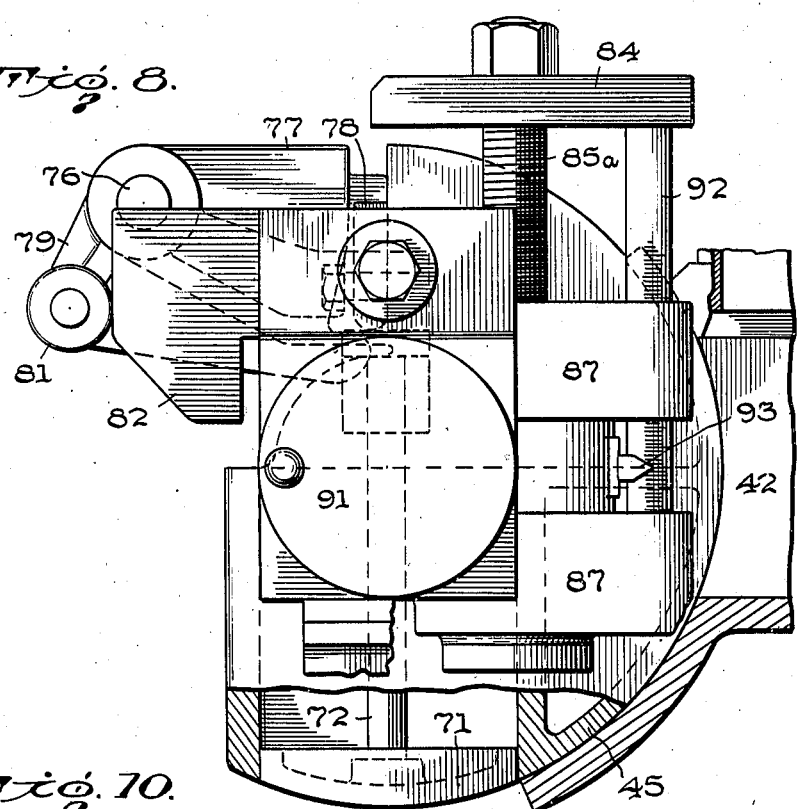
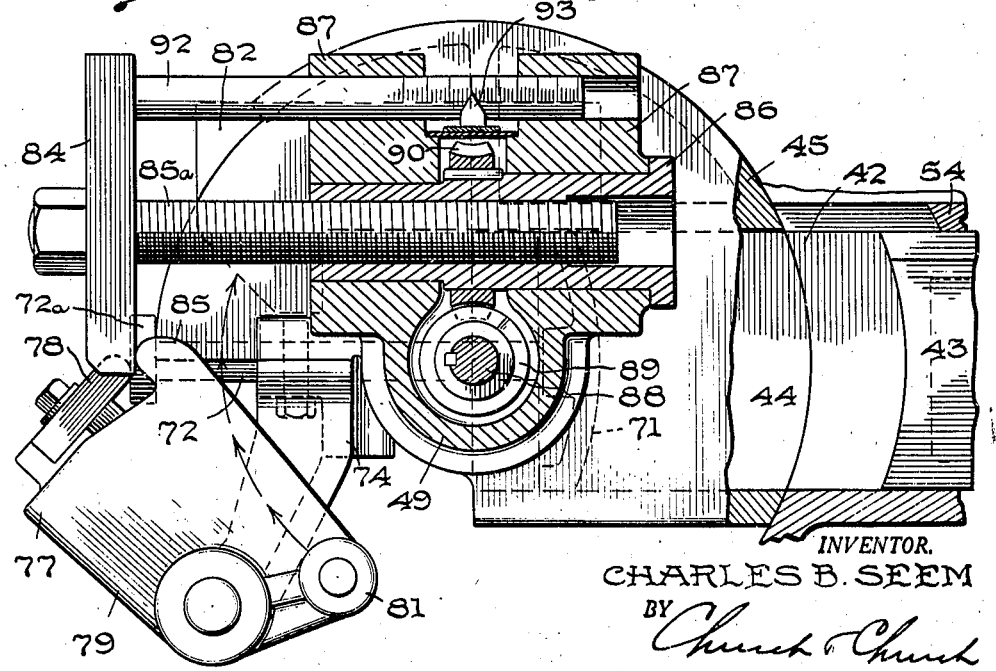

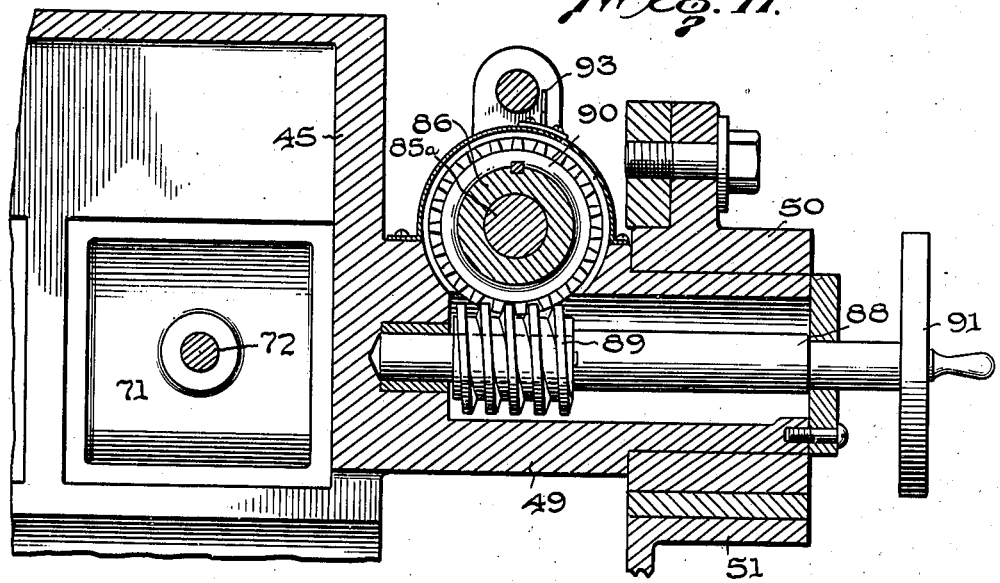

Patented June 20, 1944

2,351,840

UNITED STATES PATENT OFFICE 2,351,840

DOUGH DIVIDER

Charles B. Seem, Beacon, N. Y., assignor to Dutchess Tool Company, Inc., Beacon, N. Y., a corporation of New York Application June 11, 1943, Serial No. 490,497

13 Claims. (Cl. 107—15)

This invention relates to dough dividers of the type wherein increments of dough are fed from a mass of dough in a hopper into a compression box or chamber from which they are transferred or forced into an oscillatory divider head having one or more scaling pockets therein which subdivide each increment into a number of lumps of dough which are later ejected onto suitable means for conveying the lumps to the next machine in which they are operated upon in the present-day commercial bakery.

The primary object of the invention is to provide a dough divider of this type whose over-all dimensions are practically reduced to a minimum and in which practically all of the mechanism is located within over-all dimensions of the machine frame, so that a stream-lined effect can be given to the machine as a whole by simply enclosing the frame in suitable closure plates.

In machines of this type, a reciprocatory knife is provided above the compression box for severing successive increments of dough deposited in the box from the mass of dough in the hopper and a reciprocatory plunger slidable in the compression box forces the successive increments of dough from the box into the scaling pockets of the divider head. A further object of the invention is to provide a simplified arrangement for imparting the reciprocatory motion to the plunger, the simplification of this reciprocating mechanism lending materially to the stream-lining of the machine as a whole, primarily, by reason of the fact that it is possible to actuate both the knife and the compression chamber plunger with a straight line action.

Another object is to transmit reciprocatory motion to the compression chamber plunger by a yieldable connecting rod which may be readily adjusted so that motion can be transmitted to the plunger, if desired, from a constantly driven cam or crank shaft having a fixed throw. More specifically, the connecting rod between the crank shaft or cam and the plunger is of the dashpot type which serves several purposes in that it affords ideal control of pressures exerted on various types of dough handled in the machine and compensates for the travel of the fixed crank shaft throw, as well as for varying amounts of dough left in the compression chamber after the scaling pockets have been filled.

Machines of the present type also usually embody individual blocks or plungers slidable in the scaling pockets for discharging the lumps of dough from those pockets. These pocket blocks or plungers are adapted to be retracted in their respective pockets by the dough entering the latter from the compression box, and means are provided in the ordinary divider for limiting this retraction of the plunger, depending upon the size of the lumps of dough to be scaled in the pockets, and a further object of the present invention is to provide a simplified arrangement for adjusting or regulating the extent to which the blocks or plungers can be retracted in their individual pockets. More specifically, the invention contemplates an indexing mechanism for determining the position of the stop or stops for limiting the retraction of the plungers, which indexing mechanism is located within the over-all dimensions of the main frame of the machine, so that it does not detract from the stream-lined effect in the appearance of the machine.

For discharging the scaled lumps of dough from the scaling pockets, means are usually provided in dividers of this type for positively advancing the plungers in their pockets after the divider head has been oscillated to its discharge position, and a further object of the invention is to provide a simplified mechanism operable by the oscillatory motion of the divider head for imparting this advance movement to the plungers in their pockets. More specifically, the invention contemplates an assembly, so to speak, of the pocket plunger indexing mechanism and a portion of the plunger advancing mechanism that will lend to a reduction in the over-all dimensions of the machine, in that these instrumentalities are substantially located within the over-all dimensions of the machine frame itself.

With these and other objects in view, the invention consists in certain details of construction and combinations and arrangements of parts, all of which will be hereinafter more fully described and the novel features thereof particularly pointed out in the appended claims.

In the accompanying drawings, illustrating the preferred embodiment of the invention, Figure 1 is a side elevational view of the machine, portions being broken away to illustrate interior parts;

Fig. 2 is a rear end elevational view, with the casing removed to illustrate the interior;

Fig. 3 is a vertical sectional view, taken longitudinally of the hopper and compression box;

Fig. 4 is a vertical sectional view on the line 4—4 of Fig. 3;

Fig. 5 is a front elevational view of the divider head, illustrating in conjunction therewith the indexing mechanism for the scaling pocket plungers;

Fig. 6 is a horizontal sectional view on the line 6—6 of Fig. 5;

Fig. 7 is an end elevational view, partly broken away, of the divider head, this view being taken from the side of the machine;

Fig. 8 is a similar view, but illustrating the divider head oscillated to a point where the scaling pockets are in their discharge postion;

Fig. 9 is a sectional view on the line 9—9 of Fig. 5;

Fig. 10 is a sectional view on the line 10—10 of Fig. 5;

Fig. 11 is a sectional view on the line 11—11 of Fig. 7;

Fig. 12 is a detail sectional view, taken longitudinally of the intermediate portion of the connecting rod for the compression box plunger; and Fig. 13 is a detail view illustrating the mounting of the motor from which power is derived for operating the divider.

Referring to Figs. 1 and 2, the main frame of the divider comprises a base 20 mounted on suitable longitudinal sills 21 and what will be termed an upper platform 22, mounted on longitudinal angle bars 23. This platform 22 may also be supported on the side members 24 of the main frame. The motor 25 for operating the divider is mounted on the base 20, preferably adjacent the rear end of the machine, and power is delivered from the motor by means of a V-belt 26, running in a vari-speed motor pulley 27, and a second pulley 28 which drives a speed reducer 29. Mounted on the platform 22 are bearing pedestals 30 in which there are journaled shafts 31, 32. Shaft 31 is driven from the speed reduction mechanism by a sprocket chain 33, traveling around a sprocket 34 on shaft 31, and a sprocket 35 on shaft 36 of the speed reducing mechanism. Similarly, motion is transmitted to shaft 32 by sprocket chain 37, traveling around a sprocket 38 on shaft 32, and a sprocket 39 on shaft 36. Preferably, the shafts 31, 32 are retained in their bearings in the pedestals 30 by cap plates 40. In accordance with customary practice, the hopper 41 for the dough is located adjacent the front of the machine and, as is understood, dough passes from the hopper into a compression box 42 from whence it is ejected by a plunger 43 into the scaling pockets 44 of the divider head 45. After the pockets for the divider head have been filled with the proper amount of dough, said head is oscillated to move the pockets to their discharge position. Oscillation of the divider head is effected by a crank 46 on shaft 31, connected by rod 47 to an arm 48 on one of the trunnions 49 by which the divider head is journaled in its bearings 50, which are mounted on longitudinal members 51 of the main frame. For reciprocating the plunger 43 back and forth in the compression box 42, said plunger is connected to a second crank 52 on shaft 31 by a connecting rod that is formed of two sections 53, 53a, and the particular construction of which will be hereinafter described. As previously indicated, each increment of dough deposited in the compression box 42 is severed from the mass of dough in the hopper 41 by a knife 54 which is reciprocated by means of a cam 55 on shaft 32, said cam having a cam slot 56 therein, in which a cam roller 57 on a connecting link 58 engages, said link 58 being attached to the knife 54, so that, as the cam roller successively engages the high and low portions of the cam slot, the knife will be reciprocated back and forth beneath the hopper. It will be appreciated that the disposition of cranks 46 and 52 on shaft 31 and the development of the cam slot 56 in cam 55 will be such that the knife 54 and the plunger 43 will be reciprocated and the divider head 45 oscillated in a properly timed sequence, whereby the knife will close the top of the compression box somewhat in advance of the plunger being fully advanced in the box and the divider head will not be oscillated until after the plunger 43 has been fully advanced to deposit the required amount of dough in the several scaling pockets 44. It will be observed that all of these operating instrumentalities, from the prime mover or motor 25 through the several operating connections to the knife 54, plunger 43 and divider head 45, are located within the over-all dimensions of the frame of the machine, so that the sides of the machine may be enclosed in metal plates 59, while the rear of the machine below the platform 22 may be closed by a plate 60 which may have an opening therein with a removable closure for giving access to the motor and speed reducing mechanism. To encase or house the several cranks and cam and the shafts 31, 32, on which they are mounted, there is a hinged rear cover 61 hinged at 62, so that it may readily be elevated to give access to the parts enclosed thereby. If desired, a window 63 may be provided in the rear wall of this hinged cover. As will appear from Fig. 2, this location of the motor and the several driving connections within the over-all dimensions of the frame and the application of the housing plates to the sides, top and rear of the frame give what is termed a stream-lined appearance to the machine as a whole.

The divider head is illustrated in Fig. 1 in its charging position, wherein the scaling pockets are in registry with the compression box 42. When the divider head is oscillated to the position shown in Fig. 3 for the discharge of the lumps of dough from the scaling pockets, said lumps are ejected from the pockets and dropped onto an endless conveyor 64 by which they are transferred to the next piece of apparatus in which they are to be treated. This conveyor and its driving connections are well known in the art and need not be described in detail. Suffice it to say that power for said driving connections is taken off from shaft 36 of the speed reducer by a sprocket chain 66, traveling around a sprocket 65 on shaft 36, and a sprocket 67 on shaft 68, which carries a bevel gear meshing with a second gear 69 mounted on shaft 70 (see Fig. 1).

As is usual in dough dividers of this type, each of the scaling pockets 44, whether there be one or more of such pockets, has a so-called block or plunger 71 slidable therein, said blocks or plungers usually being provided with stems 72 slidable in bearings 73 in a bearing yoke 74 mounted on the divider head 45. As is well understood, when the plunger 43 forces an increment of dough from the compression box 43 into the scaling pockets, the plungers 71 in those pockets are moved back or retracted and, after the proper amount of dough has been deposited in the several pockets and the divider head moved to its discharge position, said scaling pocket plungers are advanced to eject the individual lumps of dough from the several pockets. In order to control the amount of dough thus forced into each pocket, means are provided for limiting this retractive movement of the scaling blocks or plungers and, to discharge the measured lumps of dough from the pockets, means, which are rendered operable upon oscillation of the divider head to its discharge position, are provided for advancing the plungers in the pockets. The arrangement for controlling the retractive movement of the scaling pocket plungers, and the mechanism for advancing those plungers, in the present machine, is shown in detail in Figs. 5 to 11. Journaled in bearings 75 of bearing yoke 73 is a shaft 76, and mounted on said shaft is an ejector bar 77 in which there is mounted a number of ejector plates 78 corresponding to the number of scaling pockets and plungers. At one end, the right hand end as viewed in Figs. 5 and 6, the ejector bar 77 is provided with a plate 79 having a bearing 80 therein for a cam roller 81, and mounted on the bearing 50 for the trunnion of the divider head there is a cam plate 82 adapted to be engaged by the cam roller 81 when the divider head is oscillated from its charging to its discharging position. For instance, referring particularly to Figs. 7 to 10, the divider head is shown in Fig. 7 with the scaling pockets in registry with the compression box 42, which is the position the parts occupy preliminary to the plunger 43 forcing the dough from the compression box into the scaling pockets. As the plunger 43 advances, the dough entering the pockets causes the scaling pocket plungers 71 to be pushed back or retracted until they reach their innermost positions, as indicated in Fig. 10. The divider head is then oscillated to position the pockets in their discharging position, as shown in Fig. 8. During the latter part of this oscillatory motion of the divider head, cam roller 81 will engage the cam 82 and cause the ejector bar 77 to be rocked on the shaft 76, as shown in Fig. 8, with the result that this movement of the ejectors relatively to the bearing yoke and the divider head as a whole will advance the plungers 71 in their pockets to expel the lumps of dough therefrom. On the return oscillatory motion of the divider head, the plungers 71 will remain in their advanced position until the next increment of dough is forced from the compression box into the pockets, and the ejector bar may either return to its original position by gravity or be returned to that position as the next increment of dough is forced into the pockets, by reason of the ends of the plunger stems 72 engaging the ejectors 78, as shown in Fig. 9. The so-called ejectors 78 are preferably separable from the ejector bar 77, being removably attached thereto by bolts 83, in order to permit adjustment of the ejectors on the ejector bar to insure alinement of them with the plungers 71 which may be provided with enlarged heads 72a to afford a larger bearing area for the ejectors 78.

To limit the inward or retractive movement of the plungers 71 under the influence of dough entering the scaling pockets from the compression box, there is an adjustable stop plate 84 against which an extension 85 on plate 79 at the end of the ejector bar 77 engages, as best illustrated in Fig. 10. In order to conserve space and lend to the stream-lining of the machine as a whole, this stop plate, which is comparatively narrow, is preferably carried on a screw 85, and said screw is threaded into a bushing or sleeve 86 journaled in abutments or extensions 87 on the trunnion of the divider head which is journaled in the bearing on which cam plate 82 is mounted. This trunnion of the divider head is of tubular construction (see Fig. 11), and journaled therein and disposed axially thereof is a shaft 88 having a worm 89 thereon meshing with a worm wheel 90 keyed to the bushing 86. Shaft 88 is provided with an operating crank or handle 91 and, by rotating shaft 88 in one direction or the other, the screw 85 may be run in or out of the bushing 86, so as to adjust the stop plate 84 longitudinally of the scaling pockets 44. Thus, the extent to which the ejector bar can be rocked on shaft 76 may be regulated by adjusting the stop plate 84 and, as will be apparent particularly from Fig. 10, the limit to which the ejector plate 77 can be rocked by reason of the extension 85 of plate 79 engaging stop 84 determines the extent to which the plungers 71 can be retracted or pushed back in the scaling pockets, because the stems of said plungers engage against the ejectors 78 on the ejector bar. As an index to the relative position to the stop plate 84, said stop carries an index bar 92 slidable in the abutments 87, and said bar 92 may be provided with a series of graduations adapted to be read in conjunction with an index or pointer 93 mounted between the abutments.

By having the stop plate 84, by which the retraction of the scaling pocket plungers is controlled, carried on one of the trunnions of the divider head, and by having the cam 82, by which the ejectors are actuated to advance the scaling pocket plungers, mounted on the bearing in which that divider head trunnion is journaled, these instrumentalities occupy a comparatively small space and do not interfere with the so-called stream-lining of the machine as a whole. Also, by having the index-adjusting wheel or crank 91 and the shaft operated thereby journaled in the tubular end section of the divider head trunnion, it is located in a fixed location, as distinguished from those types of machines wherein it oscillates back and forth with the divider head, which is highly dangerous and involves hazards to the operator. Further, by having the adjusting screw 85 for the stop plate 84 and the index bar 92 for said plate slidably mounted in the trunnion of the divider head, said screw and bar can be disposed lengthwise of the machine or lengthwise of the scaling pockets, so as not to project beyond the sides of the frame, where it would not only interfere with the stream-lining of the machine, but it would also require greater care on the part of the attendant in moving around the machine while operating the same.

As previously indicated, the connecting bar between the compression box plunger 43 and the actuating cam for the latter is of sectional construction. This is for the purpose of providing a resilient connection and a readily adjustable connection between said cam and the compression box plunger in order to prevent excessive pressures being exerted on the dough as it is forced into scaling pockets and in order that the operation of the plunger can be readily varied to control the pressure exerted by the plunger on various types of dough, it being appreciated that the plasticity of aeration of different batches of dough or types of dough vary greatly one from the other. As best shown in Fig. 12, one section of the plunger connecting rod has a portion thereof in the form of a cylinder 94 and the other section comprises a piston 95 slidable in said cylinder. In the present instance, cylinder 94 is formed in section 53a and the piston 95 is carried on section 53. In the wall of the cylinder 94, there is a duct 96 which extends from one end of the cylinder to a valve chamber 97 and from said valve chamber to the opposite end of the cylinder at the rear of piston 95. A valve 98 in the valve chamber is normally held against its seat by a spring 99, the tension on which is regulated by a screw 100. Normally, when the piston 95 is fully retracted, as shown in Fig. 12, cylinder 94 and duct 96 is filled with liquid so that the two sections 53 and 53a constitute substantially a solid structure so far as thrust strains on section 53 are concerned. However, when the pressure exerted by the compression box plunger on the dough being forced into pockets exceeds the pressure by which valve 98 is held seated by its spring 99, said valve will be unseated and permit fluid to escape from the forward portion of cylinder 94 through duct 96 to the rear side of the piston 95. Thus, the connecting rod can yield and avoid the imposition of excessive pressures on the dough which may be detrimental to the texture thereof. As will also be readily appreciated, the pressure with which the dough is forced from the pressure box into the scaling pockets can be varied simply by adjusting the screw 100 to either relieve the pressure with which ball valve 98 is held seated, or to increase that pressure. In other words, if it is desired to subject the dough to less pressure, spring 99 will be relieved and, on the other hand, if it is desired to use a greater pressure in forcing the dough into the scaling pockets, screw 100 will be adjusted to impose a greater pressure on ball valve 98 through spring 99. During the retraction of the compression box plunger, any liquid that has been by-passed through duct 96 can escape from the rear of the piston through ducts 101 in the piston. These ducts are normally closed by a disc valve 102 loosely secured to the front face of the piston by a headed screw or the like 103, it being understood that, when the piston 95 is being advanced, the disc 102 will be seated against the front face of the piston, and, when the piston is being retracted, said disc is free to be displaced from against the face of the piston to open the ducts 101.

As previously described, it is preferred that the motor 25 drive the various instrumentalities through the vari-speed pulley 27. As is well understood, in the use of such a pulley the motor is slidable on its base and, as shown more particularly in Figs. 1, 2 and 13, the motor is adapted to be moved back and forth on its base by a screw 104 journaled in the motor base and provided with a sprocket 105 around which a sprocket chain 106 passes. This sprocket chain also passes around sprockets 107, 108, rotatably mounted on the inner side of the casing and one of which is adapted to be turned by a hand wheel 109, preferably located adjacent the front end of the machine, so that the attendant, without leaving that end of the machine, may readily adjust the motor on its base. Usually, an indicating mechanism, shown in dotted lines at 110 (Fig. 2), is connected to this control for adjusting the motor on its base, so that the attendant can readily determine the speed of the vari-speed pulley.

What I claim is:

1. In a dough divider comprising a hopper, a compression box in which dough is deposited from said hopper, a divider head and a plunger for forcing dough from said box into said head, the combination of means for reciprocating said plunger comprising a tubular section having a fluid therein and a second section having a piston thereon slidable in said tubular section, and means for by-passing fluid in the tubular section from the front of said piston to the rear thereof when a predetermined pressure is exerted on dough in the compression box by said plunger.

2. In a dough divider comprising a hopper, a compression box in which dough is deposited from said hopper, a divider head and a plunger for forcing dough from said box into said head, the combination of means for reciprocating said plunger comprising a tubular section having a fluid therein and a second section having a piston thereon slidable in said tubular section, means for by-passing fluid in the tubular section from the front of said piston to the rear thereof when a predetermined pressure is exerted on dough in the compression box by said plunger, and means for varying the pressure required to by-pass fluid in said tubular section.

3. In a dough divider comprising a hopper, a compression box in which dough is deposited from said hopper, a divider head and a motor actuated plunger for forcing dough from said box into said head, the combination of means for reciprocating said plunger comprising a tubular section having a fluid therein and a second section having a piston thereon slidable in said tubular section, means for by-passing fluid in the tubular section from the front of said piston to the rear thereof when a predetermined pressure is exerted on dough in the compression box by said plunger, and non-yielding driving connections between said motor and said second section of the plunger reciprocating means.

4. In a dough divider comprising a divider head, a compression box and a plunger for forcing dough from said box into the divider head, means for reciprocating said plunger comprising a motor driven cam and a sectional connecting rod attached to said plunger and operable by said cam, one section of said rod constituting a cylinder and the other section constituting a piston slidable in the cylinder, means for by-passing fluid from the cylinder to the rear of the piston when the latter is advanced, and means for returning the by-passed fluid through the piston as the latter is retracted.

5. In a dough divider having an oscillatory head with scaling pockets therein and plungers slidable in said pockets, trunnions on said head, bearings in which said trunnions are journaled, a stop carried by one of said trunnions for limiting retraction of the plungers in their pockets, said stop comprising a stem carried by said trunnion, and means disposed axially of said trunnion for moving said stem longitudinally to adjust said stop relatively to said pockets and plungers.

6. In a dough divider having an oscillatory head with pockets therein and plungers slidable in said pockets, trunnions on said head, bearings in which said trunnions are journaled, abutments on one of said trunnions, a stop for limiting retraction of the plungers in their pockets, said stop having a stem threaded in a sleeve rotatable in said abutments, and means carried in said trunnion for rotating said sleeve.

7. In a dough divider having an oscillatory head with scaling pockets therein and plungers slidable in said pockets, a trunnion on one end of said head, a bearing in which said trunnion is journaled, a sleeve carried by said trunnion disposed longitudinally of the pockets, a stop having an extension threaded into said sleeve, said stop being adapted to limit the retraction of the plungers in their pockets, a worm shaft journaled axially of said trunnion, a worm on said shaft, and a worm wheel on said sleeve engaging said worm whereby said sleeve can be rotated to adjust said extension and stop lengthwise of the sleeve and pockets.

8. In a dough divider having an oscillatory divider head with a plurality of scaling pockets therein and plungers slidable in said pockets, bearings in which said head is journaled, a shaft carried on said head, an ejector bar pivoted on said shaft for advancing the plungers in their pockets, a cam member plate at one end of said bar, a cam member on said plate, a cam surface on one of said bearings engageable by said cam member for rocking the ejector bar on its shaft, and a stop at one end of said head engageable by the cam member plate for limiting retractive movement of the ejector bar and plungers.

9. In a dough divider having an oscillatory divider head with a plurality of scaling pockets therein and plungers slidable in said pockets, bearings in which said head is journaled, a shaft carried on said head, ejectors journaled on said shaft engageable with said plungers for advancing the latter in their pockets, a plate rigid with said ejectors, a cam roller journaled on said plate, a cam surface fixed with respect to said head and engageable by said cam roller upon oscillation of said head to rock said plate and ejectors in one direction to advance said plungers, and a stop engageable by said plate when said ejectors are rocked in the opposite direction to limit retractive movement of the ejectors and plungers.

10. In a dough divider having an oscillatory divider head with scaling pockets therein and plungers slidable in said pockets, a shaft carried by said head, an ejector bar journaled on said shaft, ejectors on said bar engageable with the plungers, a plate formed integrally with one end of said bar, a stop engageable by said plate for limiting rocking movement of the bar and ejectors on said shaft in one direction, a cam member on said plate, and a cam surface engageable by said cam member for rocking said bar and ejectors in the opposite direction.

11. In a dough divider having an oscillatory divider head with scaling pockets therein and plungers slidable in said pockets, trunnions at opposite ends of said head, bearings in which said trunnions are journaled, a shaft carried by said head, an ejector bar mounted for rocking movement on said shaft, ejectors on said bar engageable with said plungers, a stop engageable by said bar for limiting rocking movement of the bar in one direction, means for rocking said bar in the opposite direction for advancing the plungers in their pockets, and means carried in one of said trunnions for adjusting said stop longitudinally of the pockets.

12. In a dough divider comprising a hopper, an oscillating divider head at the front of said hopper, a compression box below the hopper, a knife for severing dough in the box from dough in the hopper, a plunger for transferring dough from the box to said divider head, operating cranks and a cam controlling said knife and plunger, shafts on which said cranks and cam are mounted, and motor driven connections for rotating said shafts, the combination of a main frame comprising upper and lower supporting platforms, bearings on the upper platform for said shafts, said motor for said driven connections being mounted on the lower platform, all of said elements consisting of said platforms, shafts, cams and cranks, motor and motor driven connections being positioned within the area defined by the overall dimensions of said main frame, lower closure plates extending from the lower platform up to the upper platform at the sides and rear of the main frame, and an upper cover member consisting of side, rear and top plates hingedly mounted above said frame to swing upwardly therefrom, said closure plates and cover completely encasing said elements located within said main frame.

13. A dough divider comprising a hopper, a compression box into which dough is adapted to be deposited from the hopper, an oscillating divider head at one end of the compression box, a knife for severing dough in the box, a plunger for forcing dough from said box into said head, a main frame, cam shafts journaled in said frame, constant drive connections for said cam shafts, cams on said shafts, and connections between said cams and said knife, plunger and head for actuating said elements, characterized by the connection for said plunger comprising telescoping sections having a body of fluid interposed therebetween and valve means for venting fluid from between said telescoping sections to compensate for excessive pressures imposed on the dough by said plunger.

CHARLES B. SEEM.